Patented Apr. 8, 1952

2,592,261

UNITED STATES PATENT OFFICE 2,592,261

HALOPHOSPHATE PHOSPHORS

Gorton R. Fonda, Schenectady, N. Y., assignor to General Electric Company, a corporation of New York No Drawing. Application August 11, 1950, Serial No. 178,995

4 Claims. (Cl. 252—301.6)

This invention relates to luminescent materials. More particularly, it relates to new luminescent materials of improved and unique characteristics when excited under 2537 Å.

It has been known heretofore to produce luminescent or fluorescent materials, more commonly known as phosphors, having the general formula $3Ca_3(PO_4)_2.CaX_2$ wherein X is a halide such as chlorine or fluorine or a mixture of the two. Such phosphors have the structure and composition of the mineral apatite and are usually activated by small amounts of antimony and manganese. Both antimony and manganese are essential for the activation of these materials, the antimony introducing a fluorescent band which lies in the blue, and at the same time sensitizing the emission due to the manganese, which fluorescent band lies in the red. In the absence of antimony, the fluorescence due to manganese is very weak. The resultant color of the emission from the phosphor is a combination of red and blue and depends upon the balance between the activators as well as on the halide used, which latter has an influence especially on the red manganese emission. For example, when calcium fluoride is used, the red band peak lies at about 5700 Å. When calcium chloride is used, the red band peak lies at about 5960 Å.

Heretofore, phosphors of the above type, so far as is known, have been prepared with the same metallic constituent in both the phosphate and halide phases, the phosphor corresponding to the general formula $3D_3(PO_4)_2.DX_2$, typical of apatite, where D is a metal such as calcium and X is a halide such as chlorine and fluorine or mixtures thereof. While phosphors of the above type are very useful for various purposes, it is often desirable to have available phosphors with emissions at different wavelengths and of enhanced brightness as compared to phosphors of the above type.

It is an object of the present invention to prepare phosphors of new and useful characteristics.

It is a further object of this invention to provide new phosphors of improved brightness.

It is a still further object of the invention to provide new phosphors having a fluorescent color in the deep red.

Other objects will become apparent and the invention better understood from a consideration of the following description.

It has been found that new phosphors having unique and useful characteristics may be provided by using metals, other than calcium, of Group II of the Periodic Table in the halide constituent of the calcium phosphate-halide double salt structure. The formula of such phosphors may be represented by $3Ca_3(PO_4)_2.vMX_2$ where $v$ is a number no greater than one, M is a metal selected from the group consisting of magnesium, strontium, cadmium, and zinc and X is chlorine or fluorine or a mixture of both.

It has been further found that such phosphors are activated by a combination of antimony and manganese. The antimony should be present in the amount of from a trace to about four per cent by weight of the manganese in the amount of about 0.5 to three per cent by weight based on the weight of the halophosphate compound. Typical compounds which may be used to provide the requisite antimony and manganese are the oxides, phosphates, and carbonates of these metals among others.

A phosphor of the formula $3Ca_3(PO_4)_2.CdF_2$ activated with one per cent by weight antimony and two per cent by weight manganese to its maximum brightness is overall about 40% brighter than a phosphor of the formula $3Ca_3(PO_4)_2.CaCl_2$ at its maximum brightness using the same amounts of the activators.

Besides being characterized by an enhanced brightness, the spectral emission of the calcium-cadmium phosphor is shifted toward a deeper red with the peak at 5980 Å as compared with 5960 Å for the calcium compound. This characteristic, as well as the greater brightness attainable, is of distinct advantage in fluorescent lamps or other applications where it is desired to have a strong emission in a deeper red.

A phosphor of the present type may typically be made as follows from the following ingredients:

| | Grams | Per cent by weight |
|---|---|---|
| $CaHPO_4.H_2O$ | 1.5100 | 59.61 |
| $CaCO_3$ | 0.4900 | 19.32 |
| $CdCl_2.2\frac{1}{2}H_2O$ | 0.3720 | 14.67 |
| $Sb_2O_3$ | 0.0600 | 2.36 |
| $MnNH_4PO_4$ | 0.1024 | 4.04 |

These ingredients in apatite proportions are thoroughly mixed together and fired in a horizontal quartz tube at about 1170° C. for one hour. The end of the quartz tube in the furnace is closed and the outer, projecting end plugged with glass wool. The antimony and manganese compounds are used in such proportions as to correspond to three per cent by weight antimony and two per cent by weight manganese based on the halophosphate. The other constituents are used in such proportions as to yield a compound of the formula $3Ca_3(PO_4)_2 \cdot CdCl_2$.

Actually there is some loss of cadmium chloride during the firing process through evaporation so that the actual formula is $3Ca_3(PO_4)_2 \cdot vCdCl_2$ where $v$ is a number no greater than one. However, the X-ray diffraction patterns of the phosphor show the typical apatite structure. While the preferred quantities of activators used in connection with the present phosphors are three per cent by weight antimony and two per cent by weight manganese, these activators may be used in amounts ranging from a trace up to four per cent by weight of antimony and from 0.5 to three per cent by weight of manganese without detracting from their beneficial characteristics. Also, while it is preferred to heat the phosphor mixture at about 1170° C. for about one hour, it is permissible to fire the material at from about 1100° C. to 1300° C. for periods ranging from two hours to one-half hour, the time depending upon the particular temperature used.

Phosphors made by using a halide of a metal selected from the group consisting of magnesium, strontium, cadmium, and zinc in conjunction with the calcium phosphate in apatite proportions produce, when activated with antimony and manganese, phosphors having salutary brightness. For example, taking the brightness of a luminescent material having the formula $3Ca_3(PO_4)_2 \cdot CaCl_2$ and activated with one per cent antimony and two per cent manganese as 100, the following materials of the present invention activated with like amounts of the same activators are substantially brighter or nearly as bright when excited under 2537 Å depending upon the halide used. For example, when cadmium is substituted for calcium in the chloride constituent, the relative brightness is about 120. When the halide is cadmium fluoride, the relative brightness is about 140. Using strontium chloride the relative brightness is about 87 and using magnesium fluoride, it is over 93. When zinc fluoride is used in the halide component, the relative brightness is about 80. When three per cent of antimony and two per cent of manganese based on the weight of the halophosphate are used as activators with cadmium chloride as the halide constituent, the relative brightness is about 140.

Although I have shown particular embodiments of my invention many modifications may be made and I intend, therefore, by the appended claims to cover all such modifications as fall within the true spirit and scope of my invention.

What I claim as new and desire to secure by Letters Patent of the United States is:

1. A luminescent material having the formula $3Ca_3(PO_4)_2 \cdot vCdCl_2$ wherein $v$ is a number no greater than one, said material being activated with one per cent antimony and two per cent manganese based on the weight of the halophosphate.

2. A luminescent material having the formula $3Ca_3(PO_4)_2 \cdot vCdCl_2$ wherein $v$ is a number no greater than one, said material being activated with three per cent antimony and two per cent manganese based on the weight of the halophosphate.

3. A luminescent material having the formula $3Ca_3(PO_4)_2 \cdot vCdF_2$ wherein $v$ is a number no greater than one, said material being activated with one per cent antimony and two per cent manganese based on the weight of the halophosphate.

4. A luminescent material having the formula $3Ca_3(PO_4)_2 \cdot vCdX_2$ wherein $v$ is a number no greater than 1 and X is a member selected from the group consisting of fluorine and chlorine, said material containing activating proportions of antimony and manganese corresponding to 1–3% of antimony by weight of the halophosphate and 2% manganese by weight of the halophosphate added to the materials initially present in the batch mixture.

GORTON R. FONDA.

REFERENCES CITED

The following references are of record in the file of this patent:

UNITED STATES PATENTS

| Number | Name | Date |
| --- | --- | --- |
| 2,191,351 | McKeag | Feb. 20, 1940 |
| 2,488,733 | McKeag | Nov. 22, 1949 |

FOREIGN PATENTS

| Number | Country | Date |
| --- | --- | --- |
| 525,379 | Great Britain | Aug. 27, 1940 |